United States Patent
Kurtz et al.

(10) Patent No.: US 10,393,058 B2
(45) Date of Patent: Aug. 27, 2019

(54) SYSTEM AND METHOD FOR OPERATING AN ENGINE

(71) Applicant: Ford Global Technologies, LLC, Dearborn, MI (US)

(72) Inventors: Eric Matthew Kurtz, Dearborn, MI (US); Brien Lloyd Fulton, Bloomfield Hills, MI (US); Daniel Joseph Rinkevich, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 12 days.

(21) Appl. No.: 15/808,698

(22) Filed: Nov. 9, 2017

(65) Prior Publication Data

US 2019/0136791 A1 May 9, 2019

(51) Int. Cl.
*F02D 41/40* (2006.01)
*F02N 11/08* (2006.01)

(52) U.S. Cl.
CPC ............ *F02D 41/403* (2013.01); *F02N 11/08* (2013.01); *F02D 2200/02* (2013.01); *F02D 2200/70* (2013.01)

(58) Field of Classification Search
CPC .............. F02D 41/403; F02D 2200/02; F02D 2200/70; F02D 2200/0611; F02D 2200/0618; F02D 2200/00; F02D 41/045; F02D 41/06; F02D 41/062; F02D 41/064; F02D 41/065; F02D 41/107; F02D 41/34; F02D 41/3827; F02D 41/40; F02D 41/401; F02D 41/402; F02D 1/16; F02D 41/061; F02D 41/345; F02D 41/365; F02D 2001/0085; F02D 2700/10; F02D 2250/06; F02N 11/08; F02M 41/123; F02M 41/1411
USPC ......................................................... 701/105
See application file for complete search history.

(56) References Cited

U.S. PATENT DOCUMENTS

| | | | | |
|---|---|---|---|---|
| 4,262,645 A | * | 4/1981 | Kobayashi | F02M 41/128 123/179.17 |
| 4,273,090 A | * | 6/1981 | Hofer | F02M 41/128 123/179.17 |
| 4,355,621 A | * | 10/1982 | Yasuhara | F02M 41/128 123/500 |
| 4,389,998 A | * | 6/1983 | Aoki | F02M 41/128 123/502 |
| 4,397,284 A | * | 8/1983 | Kaibara | F02M 41/128 123/501 |
| 4,463,729 A | | 8/1984 | Bullis et al. | |
| 4,503,830 A | | 3/1985 | Nakamura et al. | |
| 4,509,470 A | * | 4/1985 | Ito | F02D 1/183 123/179.16 |
| 4,763,630 A | | 8/1988 | Nagase et al. | |

(Continued)

*Primary Examiner* — Lindsay M Low
*Assistant Examiner* — John D Bailey
(74) *Attorney, Agent, or Firm* — Julia Voutyras; McCoy Russell LLP (57) ABSTRACT

Methods and systems for operating an engine with different fuels having different cetane levels are described. In one example, start of fuel injection timing for engine cylinders may be adjusted responsive to engine deceleration or combustion phase during engine cranking. The start of fuel injection timing may be retarded for higher cetane fuels and advanced for lower cetane fuels.

19 Claims, 6 Drawing Sheets

(56) References Cited

U.S. PATENT DOCUMENTS

| | | | | |
|---|---|---|---|---|
| 5,617,831 | A * | 4/1997 | Shirakawa | F02D 41/062 123/179.17 |
| 6,058,348 | A * | 5/2000 | Ohyama | F01L 13/0036 123/294 |
| 7,079,939 | B2 * | 7/2006 | Kataoka | B60K 6/485 701/112 |
| 8,423,267 | B2 * | 4/2013 | Iwatani | F02D 41/401 123/406.3 |
| 2004/0159297 | A1 * | 8/2004 | Kataoka | F02N 11/0814 123/179.4 |
| 2005/0109302 | A1 * | 5/2005 | Tetsuno | F02D 41/042 123/179.5 |
| 2006/0112936 | A1 * | 6/2006 | Tanaka | F02D 1/025 123/501 |
| 2009/0299605 | A1 * | 12/2009 | Kweon | F02D 19/0628 701/103 |
| 2010/0191440 | A1 * | 7/2010 | Iwatani | F02D 41/401 701/103 |
| 2010/0294236 | A1 * | 11/2010 | Surnilla | F02D 41/0025 123/304 |
| 2011/0265764 | A1 * | 11/2011 | Reiche | F02D 41/0025 123/435 |
| 2012/0138033 | A1 * | 6/2012 | Kurtz | B60W 10/06 123/676 |
| 2012/0143477 | A1 * | 6/2012 | Ruona | F02D 35/024 701/103 |
| 2013/0087129 | A1 * | 4/2013 | Kurtz | F02D 41/06 123/676 |
| 2013/0296126 | A1 * | 11/2013 | Gibson | F02N 11/006 477/5 |
| 2015/0252771 | A1 * | 9/2015 | Shoda | F02D 41/065 123/445 |
| 2016/0312725 | A1 * | 10/2016 | Edington | F02D 41/042 |
| 2016/0356228 | A1 * | 12/2016 | Liu | F02D 41/064 |

\* cited by examiner

SYSTEM AND METHOD FOR OPERATING AN ENGINE

BACKGROUND/SUMMARY

A diesel engine may be started while the engine is at operating temperature, while the engine is near ambient temperature, or while the engine is between ambient and operating temperature. If the diesel engine is started at a temperature that may range from ambient temperature to engine operating temperature, glow plugs may be activated to help initiate combustion within the engine and promote engine combustion stability. Activating the glow plugs may improve engine starting, but it may still be difficult to start the engine due to properties of the fuel being injected to the engine. One fuel property that may vary depending on source of the fuel, regulatory and legislative mandates, location, and time of year is the fuel's cetane number. Higher cetane fuels may tend to ignite earlier or sooner after being injected than lower cetane fuels, and this attribute may make higher cetane fuels more desirable during some operating conditions. However, higher cetane fuels may make engine starting more difficult at low ambient and engine temperatures for engines that are calibrated to the entire spectrum of market available fuel cetane. Nevertheless, a vehicle operator may not have a choice of using a fuel with a cetane number that ideally matches engine operating conditions. Therefore, it may be desirable to provide a way of operating an engine such that the engine may perform as desired whether the fuel injected to the engine is a high cetane fuel or a low cetane fuel.

The inventors herein have recognized the above-mentioned disadvantages and have developed an engine operating method, comprising: receiving sensor data to a controller; and adjusting start of fuel injection timing for a cylinder cycle of a subsequent engine start that is responsive to an indication of reverse engine rotation generated via the received sensor data before the subsequent engine start.

By adjusting start of fuel injection timing in response to reverse engine rotation, engine deceleration during engine cranking, or slow run-up speed, it may be possible to operate an engine with different fuels having different cetane numbers or levels during cold engine starting conditions. Further, by balancing a total actual number of pilot fuel injections and/or shifting quantities of fuel injected during pilot and main fuel injections, operation of an engine with fuel that has a higher or lower cetane number may be improved during engine cold starting. In particular, reverse engine rotation or engine acceleration during engine run-up that is less than a threshold engine acceleration rate may be indicative of injecting a higher cetane fuel into an engine during cranking. The engine may rotate in a reverse direction after an engine starter has been disengaged and the engine has failed to accelerate to idle speed because higher cetane fuel may begin to combust in the engine before cylinders of the engine reach top-dead-center combustion stroke. The early onset of combustion may slow down engine speed acceleration or it may decelerate the engine via a combustion related pressure rise in an engine cylinder as the cylinder's piston approaches top-dead-center compression stroke. The cylinder pressure may operate against torque provided via the engine's starter to slow the engine. The engine's reverse rotation may be an indication of high cetane fuel because the higher cetane fuel may ignite early. The start of fuel injection timing may be retarded in response to reverse engine rotation so that combustion may be delayed in the engine, thereby allowing combustion gases to accelerate the engine in a forward rotational direction. Thus, by retarding start of fuel injection timing, engine torque to accelerate the engine during engine cranking may be increased to improve engine starting.

The present description may provide several advantages. In particular, the approach may improve engine starting. In addition, the approach may decrease fuel consumption during engine starting via operating the engine more efficiently. Further, the approach may reduce engine emissions.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
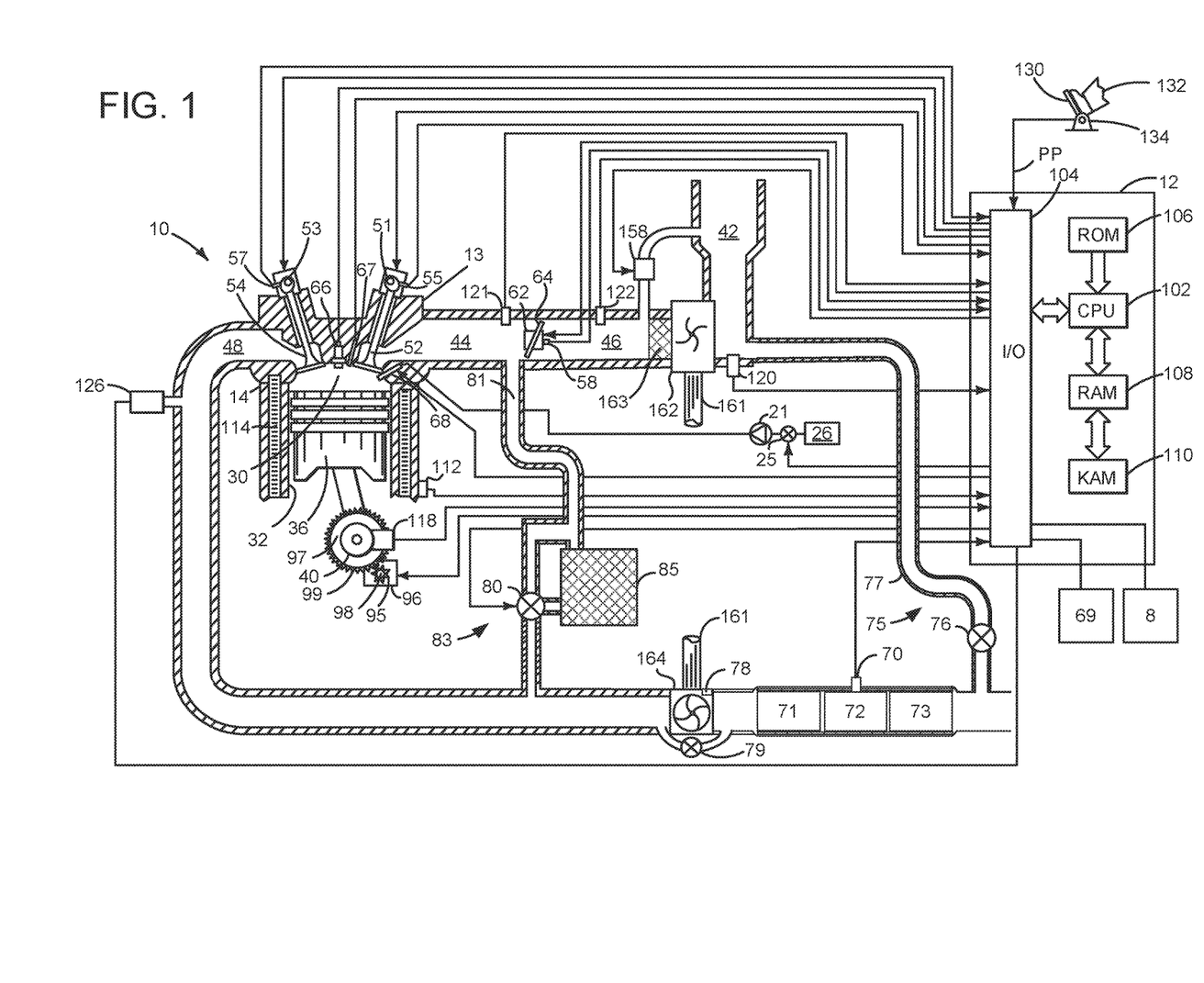
FIG. 1 shows a schematic depiction of an example engine.
Figure 2:
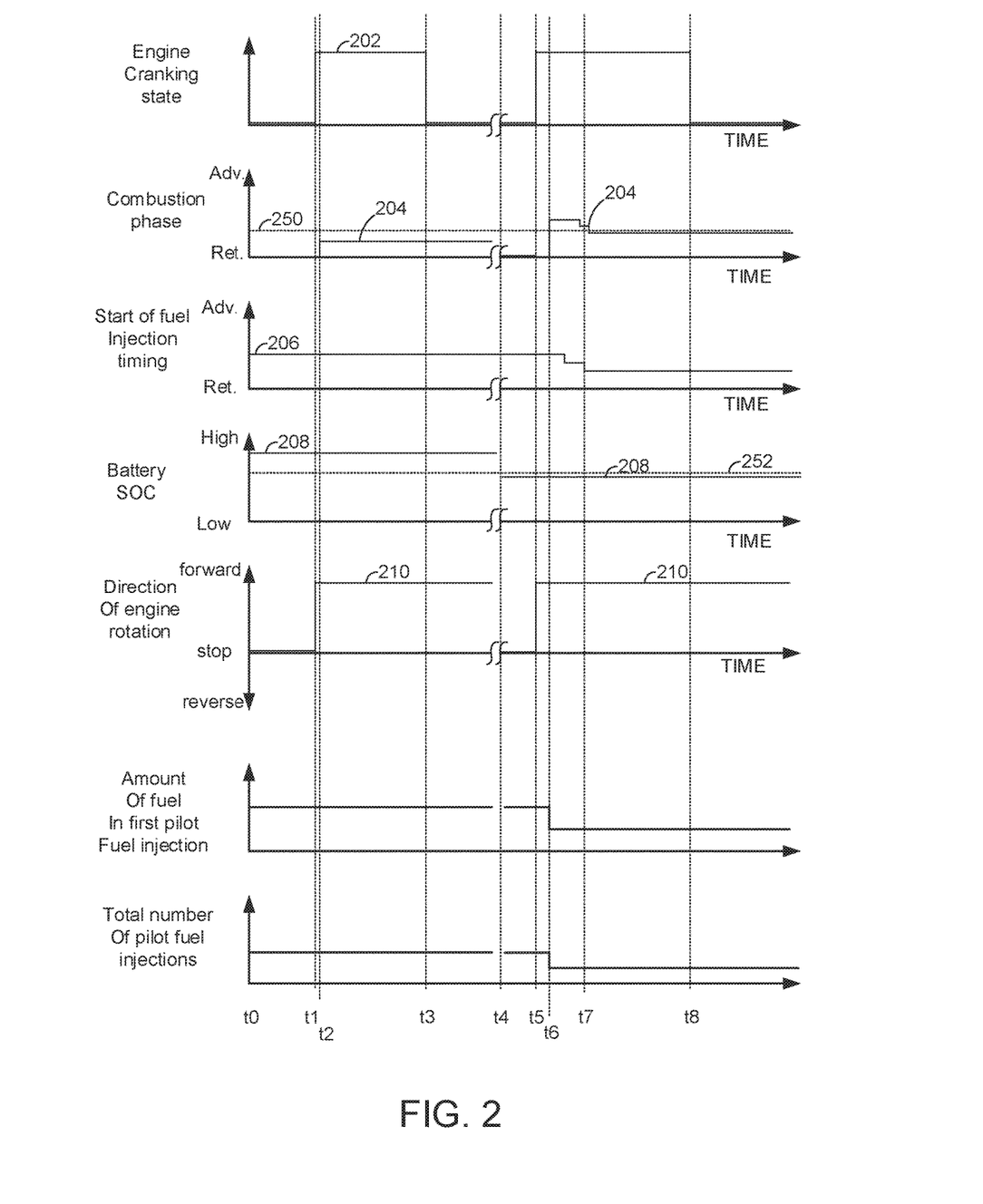
FIGS. 2 and 3 show prophetic engine cranking examples.
Figure 3:
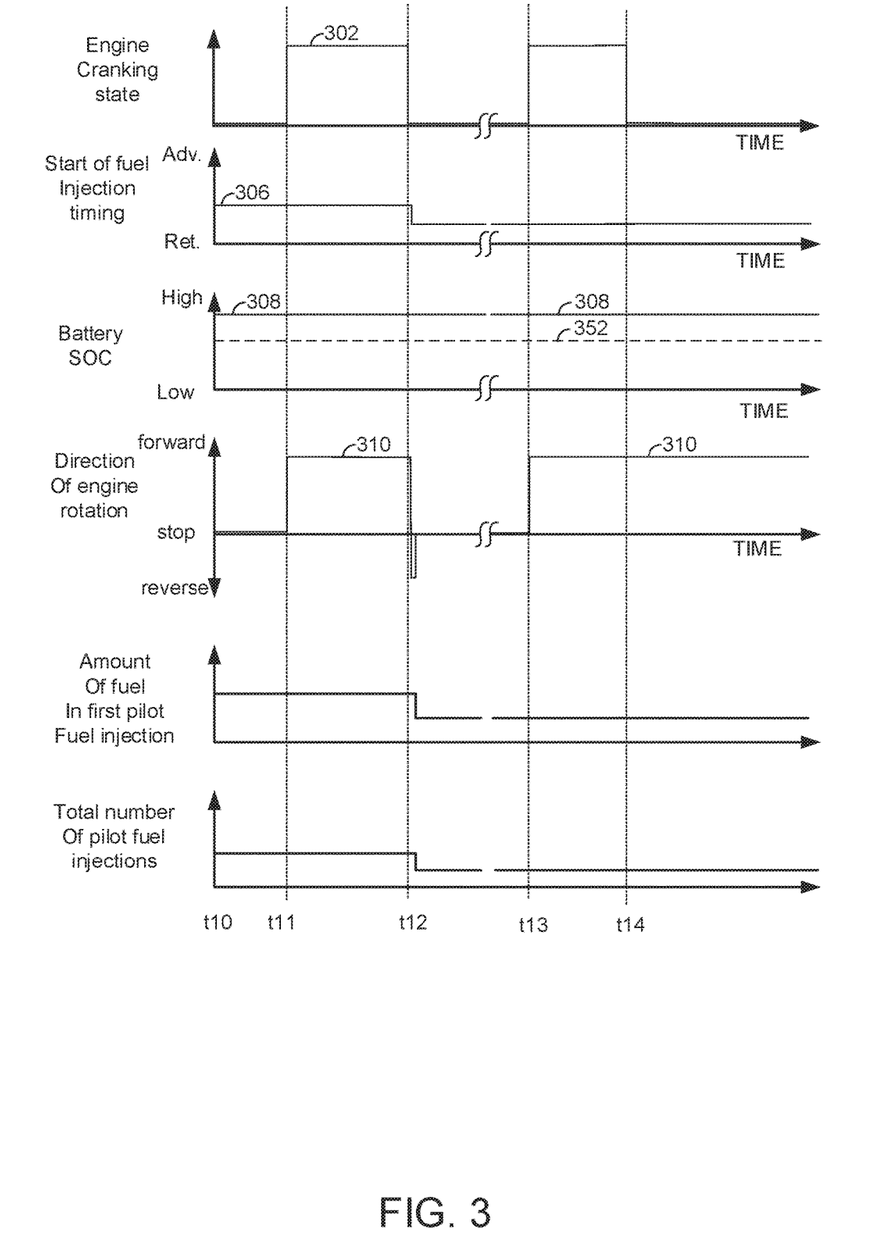

The present description is related to operating a diesel engine that may be cold started from time to time. FIG. 1 shows one example of a boosted diesel engine. FIG. 2 shows engine cranking sequences for an example engine according to the method of FIGS. 4-6. FIG. 3 shows alternative cranking sequences for the example engine according to the method of FIGS. 4-6.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 78 or compressor bypass valve 158. In alternative examples, a waste gate 79 may replace or be used in addition to variable vane control 78. Variable vane control 78 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79 or a bypass valve allow exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96 and controller 12 may monitor battery state of charge.

Combustion is initiated in the combustion chamber 30 when fuel automatically ignites when combustion chamber temperatures reach the auto-ignition temperature of the fuel when the piston 36 is near top-dead-center compression stroke. In some examples, a universal Exhaust Gas Oxygen (UEGO) sensor 126 may be coupled to exhaust manifold 48 upstream of emissions device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures a glow plug 66 may convert electrical energy into thermal energy so as to create a hot spot next to one of the fuel spray cones of an injector in the combustion chamber 30. By creating the hot spot in the combustion chamber next to the fuel spray 30, it may be easier to ignite the fuel spray plume in the cylinder, releasing heat that propagates throughout the cylinder, raising the temperature in the combustion chamber, and improving combustion. Cylinder pressure may be measured via pressure sensor 67.

Emissions device 71 can include an oxidation catalyst and it may be followed by a SCR 72 and a diesel particulate filter (DPF) 73, in one example. In another example, DPF 73 may be positioned upstream of SCR 72. Temperature sensor 70 provides an indication of SCR temperature.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may bypass EGR cooler 85, or alternatively, EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 71 to a location upstream of compressor 162. A charge air cooler 163 may be provided downstream of compressor 162.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 may provide for an engine system, comprising: a diesel engine including a cylinder, a fuel injector supplying fuel to the cylinder, and an engine position sensor; a starter coupled to the diesel engine; and a controller including executable instructions stored in non-transitory memory to adjust start of fuel injection of the fuel injector for a cycle of the cylinder (e.g., two engine revolutions for a four stroke engine) in response to engine deceleration during cranking of the diesel engine via the starter. The engine system includes where the engine deceleration is within a predetermined engine crankshaft angle range, and it further comprises additional instructions to adjust start of fuel injection of the fuel injector for the cycle of the cylinder in further response to engine acceleration during engine run-up being less than a threshold acceleration level. The engine system also includes additional instructions to adjust an amount of pilot fuel injected to the cylinder via the fuel injector for the cylinder cycle responsive to the engine deceleration during the cranking of the diesel engine.

In some examples, the engine system also includes where the engine deceleration is within a predetermined engine crankshaft angle range. The engine system includes where the predetermined engine crankshaft angle range begins at a crankshaft angle where the start of fuel injection of the fuel injector begins and ends before top-dead-center compression stroke of the cylinder. The engine system further comprises additional instructions to adjust the start of fuel injection of the fuel injector responsive to battery state of charge. The engine system further comprises additional instructions to maintain start of fuel injection timing of the fuel injector for a subsequent cycle of the cylinder in response to engine deceleration being less than a threshold amount during cranking of the engine via the starter. The engine system further comprises additional instructions to adjust the start of fuel injection of the fuel injector for a cycle of the cylinder for a subsequent engine start in response to engine reverse rotation before the engine start.

Figure 4:
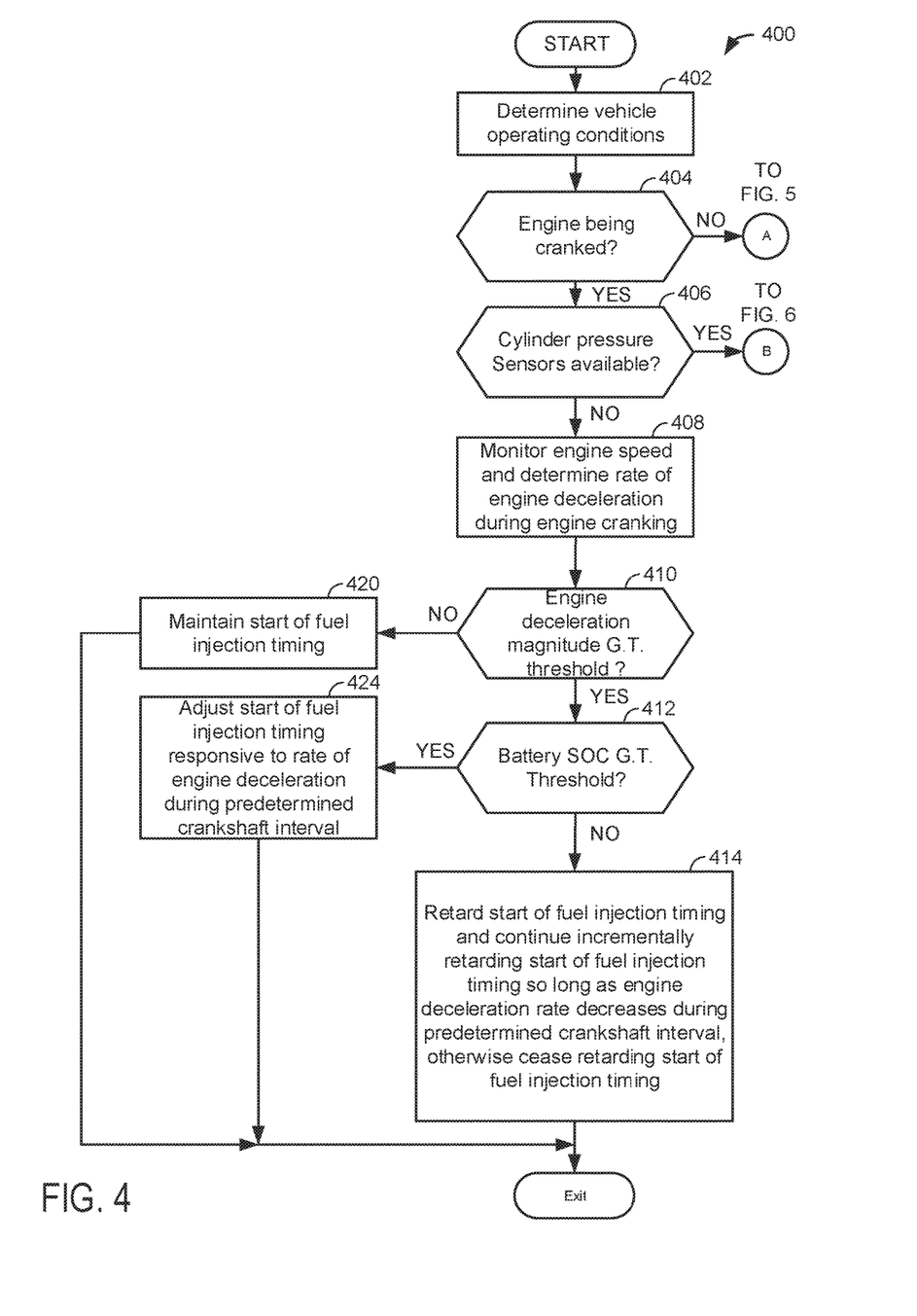
FIGS. 4-6 show an example method for operating an engine of the type shown in FIG. 1.
Figure 5:
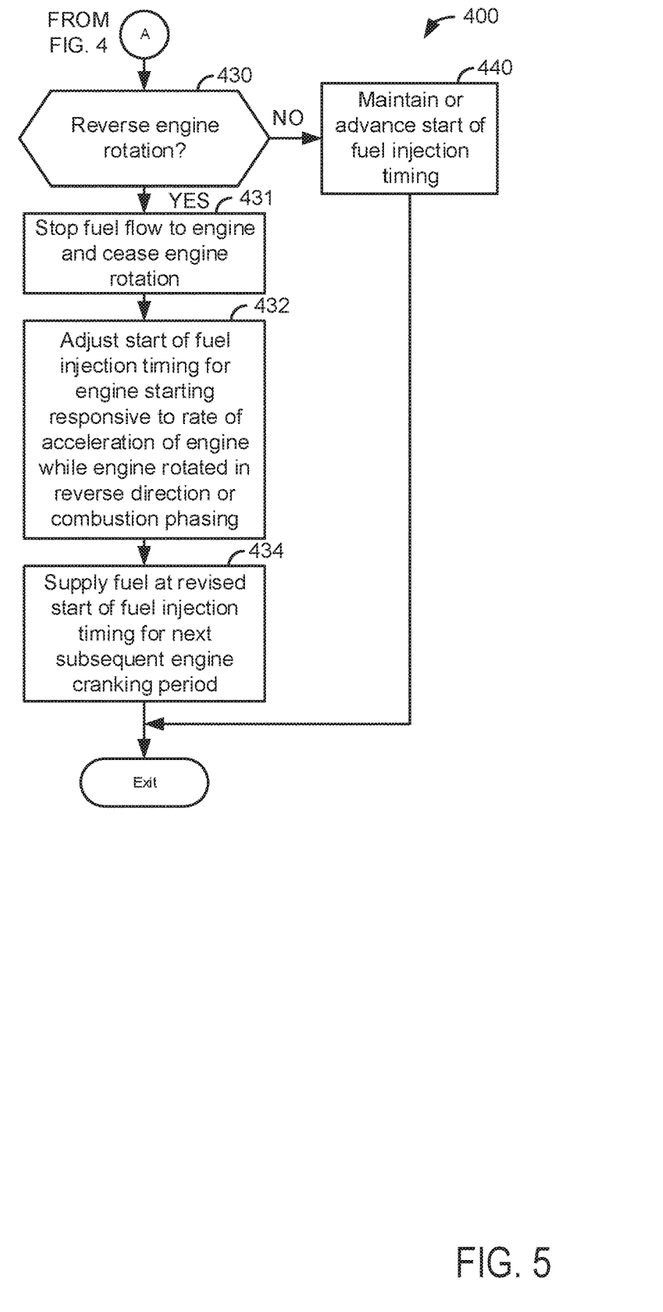
Figure 6:
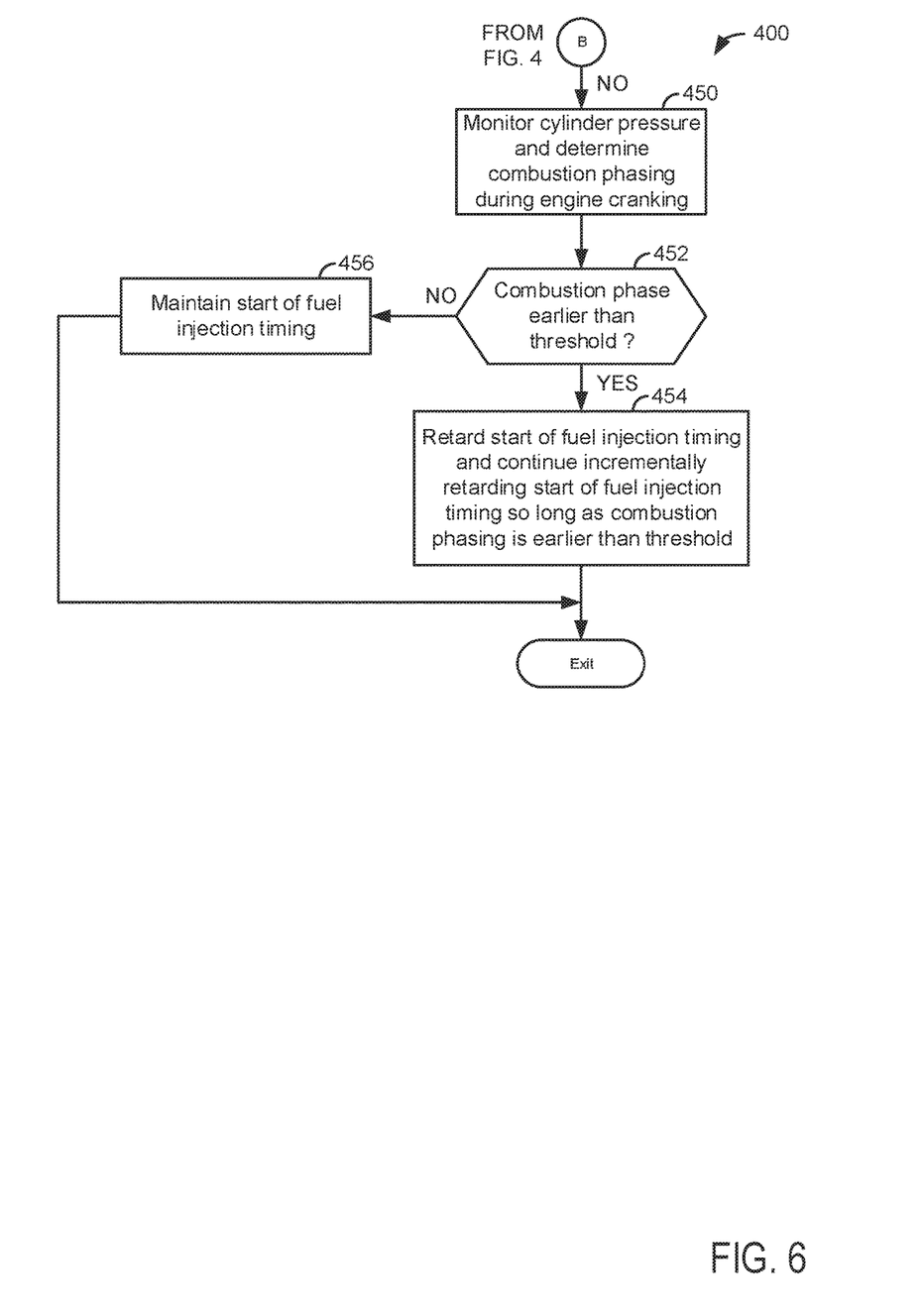

Referring now to FIG. 2, engine cranking sequences according to the method of FIGS. 4-6 are shown. The sequence of FIG. 2 may be provided via the system of FIG. 1 in cooperation with the method of FIGS. 4-6. The plots of FIG. 2 are time aligned and occur at a same time. Vertical lines at times t0-t8 represent times of interest during the sequence. The double S marks along each of the horizontal axis represent breaks in time that may be long or short. The engine system described herein may operate and include executable instructions stored in non-transitory memory to operate at all the conditions included in the descriptions of FIGS. 2 and 3.

The first plot from the top of FIG. 2 represents engine cranking state versus time. Trace 202 represents engine cranking state. The vertical axis represents engine cranking state and engine cranking occurs when trace 202 is at a higher level near the vertical axis arrow. The engine is not cranking when trace 202 is at a lower level near the horizontal axis. The horizontal axis represents time and time increases from the left side to right side of the figure.

The second plot from the top of FIG. 2 represents combustion phase for one or more engine cylinders versus time. Trace 204 represents combustion phase. The vertical axis represents combustion phase and combustion phase advances in the direction of the vertical axis arrow. Combustion phase indicates start of ignition time (e.g., onset or beginning of combustion for a cycle of a cylinder) in the engine cylinders. Thus, advancing combustion phase advances ignition within engine cylinders. The horizontal axis represents time and time increases from the left side to right side of the figure. Horizontal line 250 represents a threshold combustion phase. Combustion phase levels above threshold 250 may indicate fuel having a higher cetane number.

The third plot from the top of FIG. 2 represents start of fuel injection timing (e.g., crankshaft angle where fuel first begins to be injected to a cylinder during a cycle of the cylinder) during a cylinder cycle for one or more engine cylinders versus time. Trace 206 represents start of fuel injection time during a cylinder cycle. The vertical axis represents start of fuel injection time during a cylinder cycle and start of fuel injection advances in the direction of the vertical axis arrow. The horizontal axis represents time and time increases from the left side to right side of the figure.

The fourth plot from the top of FIG. 2 represents battery state of charge SOC versus time. Trace 208 represents battery state of charge. The vertical axis represents battery state of charge and battery state of charge increases in the direction of the vertical axis arrow. The horizontal axis represents time and time increases from the left side to right side of the figure. Horizontal line 252 represents a threshold battery state of charge. A battery state of charge below threshold 252 may indicate a low battery state of charge.

The fifth plot from the top of FIG. 2 represents direction of engine rotation versus time. Trace 210 represents direction of engine rotation. The vertical axis represents direction of engine rotation and the engine rotates in a forward direction (e.g., clockwise looking at the front of the engine) when trace 210 is at a level near the vertical axis arrow designated "forward." The engine rotates in a reverse direction (e.g., counter clockwise looking at the front of the engine) when trace 210 is at a level near the vertical axis arrow designated "reverse." The engine is stopped when trace 210 is at the level of the horizontal axis. The horizontal axis represents time and time increases from the left side to right side of the figure.

The sixth plot from the top of FIG. 2 shows an amount of fuel in a first pilot fuel injection during a cylinder cycle. The vertical axis represents the amount of fuel in a first pilot fuel injection supplied to a cylinder of the engine during a cycle of the cylinder. The amount of fuel in the first pilot fuel injection increases in the direction of the vertical axis arrow. The amount of fuel in the first pilot fuel injection is zero when the first pilot fuel injection amount is at a level of the horizontal axis. It should be noted that there may be more than only one pilot fuel injection during a cycle of a cylinder. The horizontal axis represents time and time increases from the left side to right side of the figure.

The seventh plot from the top of FIG. 2 shows a total actual number of pilot fuel injections during a cylinder cycle. The vertical axis represents the total actual number of pilot fuel injections during a cylinder cycle. The total actual number of pilot fuel injections increases in the direction of the vertical axis arrow. The total actual number of pilot fuel injections during a cylinder cycle at a level of the horizontal axis is zero. The horizontal axis represents time and time increases from the left side to right side of the figure.

At time t0, the engine is stopped (not shown) and it is not being cranked (e.g., rotated under power provided via an electric machine or starter). The combustion phase is not shown because the engine is not combusting air and fuel. Start of injection fuel timing is scheduled for a middle value crankshaft angle timing, but fuel is not injected. Battery SOC is at a higher level and direction of engine rotation indicates engine stop. The amount of fuel scheduled for a first pilot fuel injection during a cylinder cycle is a larger amount of fuel and the total number of pilot fuel injections scheduled during the cylinder cycle is a larger number of pilot fuel injections.

At the time t1, engine cranking begins and the engine is rotated via the starter as indicated by trace 202 transitioning to a higher level. The engine may be cranked responsive to a human or autonomous driver requesting an engine start via a key switch, push button, or other input. The combustion phase is not shown when the engine first begins to rotate since combustion is initiated when one of the engine cylinders approaches top-dead-center compression stroke. Start of fuel injection time is at a middle time and battery state of charge remains high. The engine begins to rotate in a forward direction as indicated by trace 210. The amount of fuel in a first pilot fuel injection during a cylinder cycle remains constant and the total number of pilot fuel injections during the cylinder cycle remains constant.

At time t2, combustion phase is determined a first time since engine cranking began and combustion phase is advanced less than threshold 250 so that the fuel injected to the engine may be interpreted as a fuel having a low or middle cetane number. Start of fuel injection time remains at a middle level and battery state of charge remains high. The engine rotates in a forward direction. Between time t2 and time t3, the engine continues to be cranked via the starter and combustion phase and start of fuel injection timing remain at their respective previous values. The battery SOC remains high and the engine continues to rotate in a forward direction. The amount of fuel included in a first pilot fuel injection during a cylinder cycle remains constant and the total number of pilot fuel injections during the cylinder cycle remains constant.

At time t3, engine cranking ceases and the engine continues to rotate in a forward direction under its own power produced from combustion in engine cylinders. The start of fuel injection timing remains at its previous timing and the combustion phasing also remains at its previous value. The battery SOC remains high. The engine may be started in this way when the fuel injected to the engine cylinders has a low to middle cetane number. The engine is stopped immediately after the break in time indicated by the SS marks along the axes. The amount of fuel included in a first pilot fuel injection during a cylinder cycle remains constant and the total number of pilot fuel injections during the cylinder cycle remains constant.

At time t4, the engine is stopped and it is not being cranked via the starter. The engine combustion phase is not reported and the start of fuel injection timing is scheduled at a middle level time. Battery state of charge is at a low level since trace 208 is below threshold 252. The engine is not rotating. The amount of fuel in a first pilot fuel injection during a cylinder cycle is a larger amount of fuel and the total number of pilot fuel injections during the cylinder cycle is a larger number of pilot fuel injections.

At time t5, engine cranking begins in response to a vehicle driver request or other vehicle operating condition. The engine begins to rotate in a forward direction in response to the engine being cranked. The combustion phase is not reported since fuel injection begins after engine rotation begins. Start of fuel injection is at a middle timing and battery SOC remains low. The amount of fuel included in a first pilot fuel injection during a cylinder cycle remains constant and the total number of pilot fuel injections during the cylinder cycle remains constant.

At time t6, combustion phase is reported and it is advanced to a timing earlier than threshold 250. The amount of fuel included in a first pilot fuel injection during a cylinder cycle is decreased and the total number of pilot fuel injections during the cylinder cycle decreases in response to the advanced combustion phase timing. Battery SOC remains low and the engine continues to be cranked in a forward direction.

Between time t6 and time t7, start of fuel injection timing is incrementally retarded each time fuel is injected to the engine in response to low battery SOC and combustion phase being advanced of threshold 250. The amount of fuel included in a first pilot fuel injection during a cylinder cycle remains constant and the total number of pilot fuel injections during the cylinder cycle remains constant. Retarding start of fuel injection timing causes combustion phasing to retard. The start of fuel injection timing is retarded until time t7 when combustion phasing is retarded to a timing later than threshold 250. The engine continues to rotate in a forward direction and battery SOC remains low. Combustion phase remains retarded from threshold 250 after time t7. The engine continues to be cranked from time t7 to time t8. The engine rotates in a forward direction after time t8 indicating that the engine starts with fuel injection timing being retarded from the initial fuel injection timing shown at time t5. The amount of fuel included in a first pilot fuel injection during a cylinder cycle remains constant and the total number of pilot fuel injections during the cylinder cycle remains constant.

In this way, the start of fuel injection timing may be retarded in response to combustion phasing being advanced greater than a threshold amount of time or crankshaft angle. The start of fuel injection timing may be retarded as long as retarding fuel injection timing retards combustion phase and as long as combustion phase is advanced from threshold 250.

Referring now to FIG. 3, alternative engine cranking sequences according to the method of FIGS. 4-6 are shown. The sequence of FIG. 3 may be provided via the system of FIG. 1 in cooperation with the method of FIGS. 4-6. The plots of FIG. 3 are time aligned and occur at a same time. Vertical lines at times t10-t14 represent times of interest during the sequence. The double S marks along each of the horizontal axis represent breaks in time that may be long or short in duration.

The first plot from the top of FIG. 3 represents engine cranking state versus time. Trace 302 represents engine cranking state. The vertical axis represents engine cranking state and engine cranking occurs when trace 302 is at a higher level near the vertical axis arrow. The engine is not cranking when trace 302 is at a lower level near the horizontal axis. The horizontal axis represents time and time increases from the left side to right side of the figure.

The second plot from the top of FIG. 3 represents start of fuel injection timing (e.g., crankshaft angle where fuel begins to be injected to a cylinder during a cycle of the cylinder) during a cylinder cycle for one or more engine cylinders versus time. Trace 306 represents start of fuel injection time during a cylinder cycle. The vertical axis represents start of fuel injection time during a cylinder cycle and start of fuel injection advances in the direction of the vertical axis arrow. The horizontal axis represents time and time increases from the left side to right side of the figure.

The third plot from the top of FIG. 3 represents battery state of charge SOC versus time. Trace 308 represents battery state of charge. The vertical axis represents battery state of charge and battery state of charge increases in the direction of the vertical axis arrow. The horizontal axis represents time and time increases from the left side to right side of the figure. Horizontal line 352 represents a threshold battery state of charge. Battery state of charge below 352 may indicate a low battery state of charge.

The fourth plot from the top of FIG. 2 represents direction of engine rotation versus time. Trace 310 represents direction of engine rotation. The vertical axis represents direction of engine rotation and the engine rotates in a forward direction (e.g., clockwise looking at the front of the engine) when trace 310 is at a level near the vertical axis arrow designated "forward." The engine rotates in a reverse direction (e.g., counter clockwise looking at the front of the engine) when trace 310 is at a level near the vertical axis arrow designated "reverse." The engine is stopped when trace 310 is at the level of the horizontal axis. The horizontal axis represents time and time increases from the left side to right side of the figure.

The fifth plot from the top of FIG. 3 shows an amount of fuel included in a first pilot fuel injection during a cylinder cycle. The vertical axis represents the amount of fuel included in a first pilot fuel injection supplied to a cylinder of the engine during a cycle of the cylinder. The amount of fuel in the first pilot fuel injection increases in the direction of the vertical axis arrow.

The amount of fuel in the pilot fuel injection is zero when the pilot fuel injection amount is at a level of the horizontal axis. It should be noted that there may be more than only one pilot fuel injection during a cycle of a cylinder. The horizontal axis represents time and time increases from the left side to right side of the figure.

The sixth plot from the top of FIG. 3 shows a total actual number of pilot fuel injections during a cylinder cycle. The vertical axis represents the total actual number of pilot fuel injections during a cylinder cycle. The total actual number of pilot fuel injections increases in the direction of the vertical axis arrow. The total actual number of pilot fuel injections during a cylinder cycle at a level of the horizontal axis is zero. The horizontal axis represents time and time increases from the left side to right side of the figure.

At time t10, the engine is stopped (not shown) and it is not being cranked (e.g., rotated under power provided via an electric machine or starter). Start of fuel injection timing is scheduled for a middle crankshaft angle timing, but fuel is not injected. Battery SOC is at a higher level and direction of engine rotation indicates engine stop. The amount of fuel in a first pilot fuel injection during a cylinder cycle is a larger amount and the total number of pilot fuel injections during the cylinder cycle is a larger number of pilot fuel injections.

At the time t11, engine cranking begins and the engine is rotated via the starter as indicated by trace 302 transitioning to a higher level. The engine may be cranked responsive to a human or autonomous driver requesting an engine start via a key switch, push button, or other input. Start of fuel injection time is at a middle time and battery state of charge remains high. The engine begins to rotate in a forward direction as indicated by trace 310. The amount of fuel in a first pilot fuel injection during a cylinder cycle remains constant and the total number of pilot fuel injections during the cylinder cycle remains constant.

Between time t11 and time t12, engine cranking continues and start of fuel injection time remains at a middle advance level. The battery SOC remain high and the engine is rotated in a forward direction. The engine does not start and it remains rotating via the engine starter (not shown). The amount of fuel in a first pilot fuel injection during a cylinder cycle remains constant and the total number of pilot fuel injections during the cylinder cycle remains constant.

At time t12, engine cranking ceases in response to a vehicle operator releasing an engine start request, an amount of engine cranking time expiring, or other condition (not shown). The engine's momentum causes the engine to continue rotating for a short time after time t12, and then, the engine rotates in a reverse direction in response to pressure building within the cylinder due to advanced combustion timing in an engine cylinder. The reverse engine rotation may indicate that a high cetane fuel was injected to engine cylinders since the injected high cetane fuel may ignite soon after it is injected. Ignition of the fuel may cause pressure within the cylinder to rise significantly before a piston in the cylinder reaches top-dead-center compression stroke. The earlier occurrence of high cylinder pressure may cause the piston to change direction before it reaches top-dead-center compression stroke, thereby reversing engine rotation. The engine stops rotating after the short period of engine rotation due to ceasing of fuel injection and the starter not being engaged. The start of fuel injection timing is scheduled for a more retarded timing in response to the engine rotating in a reverse direction after engine cranking ceases (e.g., after power delivery to the starter ceases). The start of fuel injection timing is scheduled for a next time the engine is cranked. The battery SOC remains high.

Shortly after reverse engine rotation is detected, the amount of fuel included in a first pilot fuel injection during a cylinder cycle is decreased and the total number of pilot fuel injections during the cylinder cycle is decreased in response to the indication of reverse engine rotation. A break in time occurs between time t12 and time t13.

At time t13, engine cranking begins in response to a vehicle driver request or other vehicle operating condition and start of fuel injection timing is retarded as compared to start of fuel injection timing at time t11. The start of fuel injection timing is retarded in response to the reverse engine rotation detected shortly after time t12. In addition, the amount of fuel in a first pilot fuel injection during a cylinder cycle is a lower amount and the total number of pilot fuel injections during the cylinder cycle is a lower amount in response to the reverse engine rotation. The battery SOC remains high and the engine begins to rotate in a forward direction.

At time t14, engine cranking ceases and the engine continues to rotate in a forward direction indicating that the engine is started and rotating under its own power. The start of fuel injection timing remains at its previous level and battery SOC remains at a higher level. Further, the amount of fuel in the first pilot fuel injection of a cylinder cycle remains at the previous value and the actual total number of pilot fuel injections remains at the previous value.

In this way, the start of fuel injection timing may be retarded in response to reverse engine rotation following engine cranking. The start of fuel injection timing adjustment may be generated before an immediately following engine restart or cranking begins. By retarding the start of fuel injection timing in preparation for a next subsequent engine cranking period and during the next subsequent engine cranking period, it may be possible to adjust fuel injection timing so that the engine may have improved acceleration during engine starting. The improved engine acceleration may allow the engine to reach engine idle speed.

Referring now to FIGS. 4-6, a method for operating an engine is shown. In particular, a flowchart of a method for operating an internal combustion engine is shown. The method of FIGS. 4-6 may be stored as executable instructions in non-transitory memory in systems such as shown in FIG. 1. The method of FIGS. 4-6 may be incorporated into and may cooperate with the systems of FIG. 1. Further, at least portions of the method of FIGS. 4-6 may be incorporated as executable instructions stored in non-transitory memory while other portions of the method may be performed via a controller transforming operating states of devices and actuators in the physical world. The controller may employ engine actuators of the engine system to adjust engine operation, according to the method described below. Further, method 400 may determine selected control parameters from sensor input. An engine may be in the process of being cranked or operating while or during a time when method 400 is executed. Further, the engine may be operated according to controller instructions that allow the engine to reverse engine rotate after engine cranking or slow engine speed during compression strokes as the engine is being cranked. Further, the engine may operate at and controller 12 may include executable instructions stored in non-transitory memory to operate the an engine at all the engine operating conditions described herein.

At 402, method 400 determines vehicle operating conditions. Vehicle operating conditions may include but are not limited to engine temperature, accelerator pedal position, particulate filter soot loading, ambient temperature, ambient pressure, driver demand torque, engine speed, engine rotation direction, and engine speed. Vehicle operating conditions may be determined via vehicle sensors and the engine controller described in FIG. 1.

In addition, if it is determined that fuel has been added to the fuel tank based on fuel tank level, method 400 may adjust start of fuel injection timing for each cylinder cycle after an estimate of cetane of the mixed fuel in the fuel tank has been made. An estimate of cetane level in the fuel tank may be based on fuel data provided at the fuel filling station and known properties of the fuel in the fuel tank. For example, if fuel added to the fuel tank has a cetane number of 50 and fuel added to the fuel tank has a cetane number of 60, then the mixed fuel will have a cetane number between 50 and 60 depending on the amounts of the respective fuels. Method 400 proceeds to 404.

At 404, method 400 judges if the engine is being cranked (e.g., rotated via the engine starter when torque from combustion in the engine is insufficient to accelerate the engine to a predetermined speed greater than engine cranking speed) via the engine starter. In one example, method 400 may judge that the engine is being cranked if electrical power is applied to the starter (e.g., the starter is commanded on via the controller) and if engine rotation in a forward detection is detected via the engine position sensor. If method 400 judges that the engine is being cranked, the answer is yes and method 400 proceeds to 406. Otherwise, the answer is no and method 400 proceeds to 430.

At 406, method 400 judges if engine cylinder pressure sensors are available in the present vehicle that includes the engine. In one example, method 400 may judge that the engine includes cylinder pressure sensors if a variable stored in memory indicates that the present vehicle configuration includes cylinder pressure sensors. If the variable in memory indicates pressure sensors are available, the answer is yes and method 400 proceeds to 450. If the variable stored in memory does not indicate the present vehicle configuration includes pressure sensors, the answer is no and method 400 proceeds to 408.

At 408, method 400 monitors engine speed and determines a rate of engine deceleration during engine cranking. In one example, method 400 determines engine speed by measuring an amount of time it takes the engine to travel between two positions (e.g., 360 degrees in 0.1 seconds) and converting the degrees per second into revolutions per minute. The rate of engine acceleration or deceleration may then be provided via taking a first derivative of engine speed measurements. The first derivative may be estimated by subtracting a first engine speed measurement from a second engine speed measurement and dividing the result by the amount of time between the first engine speed measurement and the second engine speed measurement. Engine acceleration may be indicated via a positive engine acceleration value and engine deceleration may be indicated via a negative engine acceleration value. In addition, method 400 may determine engine acceleration/deceleration during predetermined crankshaft angle ranges to determine if fuel injection start of fuel injection timing is causing the engine to decelerate more than is desired. In one example, the engine crankshaft angle for determining engine acceleration/deceleration begins at a crankshaft angle where start of fuel injection begins and ends at or before top-dead-center compression stroke of the cylinder receiving the fuel. For example, for cylinder number one, start of fuel injection may be 30 crankshaft degrees before top-dead-center compression stroke of cylinder number one. Engine acceleration/deceleration for cylinder number one may be determined from 30 crankshaft degrees before top-dead-center compression stroke of cylinder number one to top-dead-center compression stroke for cylinder number one, where the 30 crankshaft degrees before top-dead-center compression stroke and the top-dead-center compression stroke occur during the same cylinder cycle.

It should be noted that the engine decelerates during the compression stroke due to shrinking cylinder volume and trapped gases in the engine cylinder. Further, the engine may decelerate during the compression stroke due to pressure increase in the cylinder related to or caused by combustion in the cylinder. The engine may accelerate after passing top-dead-center compression stroke since pressure in the cylinder provides force to displace the piston away from the cylinder head. Method 400 proceeds to 410 after determining the engine acceleration/deceleration rate.

At 410, method 400 judges if engine deceleration during the predetermined crankshaft angle range has a magnitude that is greater than a threshold. A greater magnitude of engine deceleration may be indicative of injecting high cetane fuel to the engine cylinder and combusting the high cetane fuel in the engine cylinder earlier than is desired. Conversely, if a lower cetane fuel is injected, a delay from start of injection to initiation of combustion during a cylinder cycle may be sufficiently long that pressure rise in the cylinder caused by combusting the lower cetane fuel is delayed until the cylinder enters its power stroke. If method 400 judges that the engine deceleration magnitude is greater than a threshold, the answer is yes and method 400 proceeds to 412. Otherwise, the answer is no and method 400 proceeds to 420.

At 420, method 400 maintains start of fuel injection timing for engine cycles at their present timing. Method 400 proceeds to exit.

At 412, method 400 judges if battery state of charge (SOC) is greater than (G.T.) a threshold battery state of charge. In one example, method 400 may estimate battery SOC via measuring battery voltage and coulomb counting as is known. If method 400 judges that battery SOC is greater than a threshold SOC, the answer is yes and method 400 proceeds to 424. Otherwise, the answer is no and method 400 proceeds to 414.

At 424, method 400 adjusts start of fuel injection timing for one or more engine cylinders responsive to rate of engine deceleration during the predetermined crankshaft interval described at 408. For example, if engine acceleration/deceleration for cylinder number one is determined from 30 crankshaft degrees before top-dead-center compression stroke of cylinder number one (e.g., start of fuel injection time for cylinder number one) to top-dead-center compression stroke for cylinder number one during the same cylinder cycle, then start of fuel injection timing for injecting fuel to cylinder number one during a next cycle of cylinder number one may be retarded by 5 crankshaft degrees. Likewise, if engine acceleration/deceleration for cylinder number two is determined from 30 crankshaft degrees before top-dead-center compression stroke of cylinder number two (e.g., start of fuel injection time for cylinder number two) to top-dead-center compression stroke for cylinder number two during the same cylinder cycle, then start of fuel injection timing for injecting fuel to cylinder number two during a next cycle of cylinder number two may be retarded by 5 crankshaft degrees. In one example, a table or function of empirically determined start of fuel injection timing adjustments is referenced by magnitude of engine deceleration and the table or function outputs an adjustment value that is added to the start of fuel injection timing for an engine cylinder. In addition, start of fuel injection timing during an engine cycle may be adjusted responsive to engine temperature. For example, start of fuel injection timing may be retarded more significantly as engine temperature decreases. Method 400 proceeds to exit after adjusting start of fuel injection timing during each cylinder cycle during engine cranking.

In this way, it may be possible to adjust the start of fuel injection timing to quickly compensate for fuels having higher cetane levels while allowing a highly charged battery to continue to supply power to rotate the engine even if a high cranking torque may be needed to rotate the engine.

Start of fuel injection timing for a cylinder cycle may begin with a pilot fuel injection. The earliest fuel injection timing during a cylinder cycle may be start of fuel injection timing of pilot fuel injections or it may be start of fuel injection timing for main fuel injections. Pilot injections are short duration fuel injections that may provide less than 4 milligrams of fuel to the cylinder. Pilot fuel injections start and end before top-dead-center compression stroke in the cylinder cycle in which they are injected. The pilot fuel injections may reduce engine combustion noise, control peak cylinder pressures, and adjust heat release within the cylinder. Main fuel injections are injections of a greatest amount of fuel during a cylinder cycle. The main fuel injections may deliver fuel mass ranging from 3 milligrams to 100 milligrams per cylinder cycle. Pilot fuel injections precede the main fuel injections in a cylinder cycle. Early post fuel injections may occur ten crankshaft degrees after top dead center compression stroke and after a main fuel injection. Early post fuel injections may deliver fuel mass ranging from 1 milligram to 10 milligrams. Late post injections are fuel injections that are preformed after combustion of the main fuel injection pulse is complete and before an exhaust valve of the cylinder receiving the fuel closes during the cylinder cycle. Early and late post injections may be useful for regenerating emissions control devices in the engine's exhaust system.

An amount of fuel supplied during a pilot fuel injection of a cylinder cycle may be reduced and an amount of fuel in a main fuel injection during the cylinder cycle may be increased by the amount of fuel that is removed from one or more pilot fuel injections. The pilot fuel injection amount may be reduced and the main fuel injection amount may be increased in response to engine deceleration being greater than a threshold deceleration. For example, 1 milligram of fuel may be removed from one or more pilot fuel injections and added to a main fuel injection for a cylinder cycle after engine deceleration magnitude has been determined to be greater than a threshold magnitude.

In another example, 1 milligram of fuel may be removed from a first pilot fuel injection of a cylinder cycle and added to a later pilot fuel injection for the cylinder cycle after engine deceleration magnitude has been determined to be greater than a threshold magnitude. In other words, if an engine includes base fuel injection amounts comprising two pilot fuel injections of 3 milligrams and a main fuel injection of 6 milligrams during engine cranking, and it has been determined that the engine decelerated with magnitude greater than a threshold during a cylinder cycle, then during a subsequent engine cycle with the same cranking conditions, the amount of fuel included in the first pilot fuel injection may be reduced to 2 milligrams, the amount of fuel in the second pilot fuel injection may be increased to 4 milligrams, and the amount of fuel injected during the main injection may be increased to 7 milligrams.

Additionally, the actual total number of pilot fuel injections may be reduced in response to engine deceleration being greater than a threshold deceleration. For example, if an engine's base fuel injection amount includes two pilot fuel injections of 3 milligrams and a main fuel injection of 6 milligrams during engine cranking, and it has been determined that the engine decelerated with magnitude greater than a threshold during a cylinder cycle, then during a subsequent engine cycle with the same cranking conditions, the actual total number of pilot fuel injections may be reduced to one and the amount of fuel in the only pilot fuel injection may be increased to 4 milligrams. The one pilot fuel injection's start of fuel injection time may be retarded from the start of injection timing of the original pilot fuel injection in the prior cylinder cycle. The amount of fuel injected during the main fuel injection may be increased to 10 milligrams. Thus, not only may the start of fuel injection timing be adjusted responsive to engine deceleration, the actual total number of pilot fuel injections and amounts of fuel in the pilot fuel injections during a cylinder cycle may be adjusted responsive to engine deceleration.

At 414, method 400 retards start of fuel injection timing. Further, method 400 then continuously incrementally retards start of fuel injection as long as the engine deceleration rate magnitude during the predetermined crankshaft interval described at 408 decreases responsive to retarding start of fuel injection timing for the engine cylinders. Otherwise, method 400 ceases retarding start of fuel injection timing for the engine cylinders. For example, if start of fuel injection timing for all engine cylinders is 30 crankshaft degrees before top-dead-center of the cylinder receiving the fuel and engine deceleration during a predetermined crankshaft interval exceeds X RPM/sec$^2$, start of fuel injection for all engine cylinders may be retarded to 29 crankshaft degrees before top-dead-center compression stroke. If during a subsequent cylinder cycle where start of fuel injection has been retarded to 29 crankshaft degrees and engine deceleration during the predetermined crankshaft interval exceeds X RPM/sec$^2$, start of fuel injection for all engine cylinders may be retarded to 28 crankshaft degrees before top-dead-center compression stroke. If during a subsequent cylinder cycle where start of fuel injection has been retarded to 28 crankshaft degrees and engine deceleration during the predetermined crankshaft interval does not exceed X RPM/sec$^2$, start of fuel injection for all engine cylinders may be maintained at 28 crankshaft degrees before top-dead-center compression stroke. In this way, start of fuel injection timing for each engine cylinder may be adjusted to reduce the magnitude of engine deceleration during engine cranking. By retarding start of fuel injection timing in this way, it may be possible to conserve battery charge by reducing work the starter has to perform to rotate the engine while increasing engine acceleration during and after cranking. In addition, start of fuel injection during an engine cycle may be adjusted responsive to engine temperature. For example, start of fuel injection timing may be retarded more significantly as engine temperature decreases.

In addition, method 400 may adjust an amount of fuel that is supplied during pilot fuel injections of the cylinder cycle. In particular, the amount of fuel in a pilot fuel injection may be reduced and an amount of fuel in a main fuel injection during the cylinder cycle may be increased by the amount of fuel that is removed from one or more pilot fuel injections in response to engine deceleration being greater than a threshold deceleration. For example, 1 milligram of fuel may be removed from one or more pilot fuel injections and added to a main fuel injection for a cylinder cycle after engine deceleration magnitude has been determined to be greater than a threshold magnitude.

In another example, 1 milligram of fuel may be removed from a first pilot fuel injection of a cylinder cycle and added to a later pilot fuel injection for the cylinder cycle after engine deceleration magnitude has been determined to be greater than a threshold magnitude. In other words, if fuel injection to an engine cylinder includes two pilot fuel injections of 3 milligrams and a main fuel injection of 6 milligrams during a cylinder cycle while the engine is being cranked, and it has been determined that the engine has decelerated with a magnitude greater than a threshold magnitude during a cylinder cycle, then during a subsequent engine cycle with the same cranking conditions, the amount of fuel in the first pilot fuel injection may be reduced to 2 milligrams, the amount of fuel in the second pilot fuel injection may be increased to 4 milligrams, and the amount of fuel injected during the main injection may be increased to 7 milligrams.

In addition, the actual total number of pilot fuel injections may be reduced in response to engine deceleration being greater than a threshold deceleration. For example, if an engine includes two pilot fuel injections of 3 milligrams each and a main fuel injection of 6 milligrams during a cylinder cycle while the engine is being cranked, and if it has been determined that the engine decelerated with magnitude greater than a threshold during the cylinder cycle, then during a subsequent engine cycle with the same cranking conditions, the actual total number of pilot fuel injections may be adjusted to one pilot fuel injection. The amount of fuel in the first and only pilot fuel injection during a subsequent cylinder cycle may be increased to 4 milligrams. Further, the amount of fuel injected during the main injection may be increased to 10 milligrams. Thus, not only may the start of fuel injection timing be adjusted responsive to engine deceleration, the actual total number of pilot fuel injections and the amounts of fuel in the pilot fuel injections may be adjusted responsive to engine deceleration.

At 430, method 400 judges if reverse engine rotation has taken place since the last most recent time the engine was cranked. In one example, reverse engine rotation may be indicated via the engine position sensor. If method 400 judges that reverse engine rotation has taken place since the last most recent time the engine was cranked, the answer is yes and method 400 proceeds to 431. Otherwise, the answer is no and method 400 proceeds to 440.

At 440, method 400 maintains present start of fuel injection timing for engine cylinders if the engine is started after engine cranking. However, the start of fuel injection timing after engine run-up to engine idle speed may be adjusted responsive to engine speed and torque output when the engine is running. If the engine is stopped and not rotating, start of fuel injection timing may be returned to a base start of fuel injection timing for fuels with nominal cetane numbers (e.g., cetane numbers between 40 and 55). The base start of fuel injection timing may be a fuel injection timing that induces ignition timing earlier than is desired for fuel having higher cetane numbers (e.g., cetane numbers>55). The next time the engine is restarted, fuel is injected at the base start of fuel injection timing. By returning to base start of fuel injection timing, start of fuel injection timing during engine cranking may be advanced from start of fuel injection timing when fuel with a higher cetane number is injected to the engine during engine cranking.

In addition, if the engine's acceleration rate is less than a threshold engine acceleration rate while the engine is running up (e.g., accelerating) from cranking speed to idle speed (e.g., immediately after cranking and before reaching engine idle speed), start of fuel injection timing may be retarded responsive to the rate of engine acceleration during engine run-up. The amount of start of fuel injection timing retard for a cylinder cycle may be empirically determined and stored to controller memory. For example, an engine may be cold started with several different cetane fuels to determine expected engine acceleration rates when the engine is operated with the different cetane fuels at nominal start of fuel injection timings (e.g., start of fuel injection timings for nominal cetane fuels). The start of injection timing may be retarded and the engine may be restarted again to determine if the engine accelerates at a desired rate while operating the engine with the different cetane fuels. The process may be repeated until desired engine acceleration rates are provided with start of fuel injection timings for each of the different cetane fuels. Method 400 proceeds to exit.

At 431, method ceases fuel flow to the engine to cease engine rotation. Method 400 proceeds to 432.

At 432, method 400 adjusts start of fuel injection timing for one or more engine cylinders responsive to the rate of engine acceleration/deceleration during a predetermined crankshaft interval when the engine rotated in the reverse direction. The rate of engine acceleration during a predetermined crankshaft angular interval when the engine is rotated in the reverse direction may be indicative of the cetane number of the injected fuel. Fuels having higher cetane numbers may provide higher engine acceleration rates in the reverse engine direction since higher cetane fuel may ignite earlier than lower cetane fuels so that the fuel may ignite in a larger cylinder volume, thereby reducing reverse engine acceleration as compared to if fuel having a slightly lower cetane number were injected to the engine's cylinders. In one example, the start of fuel injection timing may be retarded a greater amount in response to a lower rate of engine acceleration in the reverse engine rotational direction. The start of fuel injection timing may be retarded a smaller amount in response to a higher rate of engine acceleration in the reverse engine rotational direction. For example, if engine acceleration in the reverse engine rotation direction is 5 crankshaft degrees/sec$^2$, the start of fuel injection timing may be retarded 5 crankshaft degrees. If engine acceleration in the reverse engine rotation direction is 15 crankshaft degrees/sec$^2$, the start of fuel injection timing may be retarded 2 crankshaft degrees. The start of fuel injection timing is adjusted for the next time the engine is cranked via the starter. The predetermined crankshaft interval for determining engine acceleration during reverse engine rotation may be from top-dead-center compression stroke to bottom-dead-center compression stroke.

In addition, method 400 may adjust an amount of fuel that is supplied during pilot fuel injections of a subsequent cylinder cycle after the engine reverse rotation. In particular, the amount of fuel in a pilot fuel injection may be reduced and an amount of fuel in a main fuel injection during the cylinder cycle may be increased by the amount of fuel that is removed from one or more pilot fuel injections in response to engine deceleration being greater than a threshold deceleration. For example, 1 milligram of fuel may be removed from one or more pilot fuel injections and added to a main fuel injection for a cylinder cycle after reverse engine rotation has occurred.

In another example, 1 milligram of fuel may be removed from a first pilot fuel injection of a subsequent cylinder cycle after engine reverse rotation and added to a later pilot fuel injection for the subsequent cylinder cycle after reverse engine rotation. In other words, if fuel injection to an engine cylinder includes two pilot fuel injections of 3 milligrams and a main fuel injection of 6 milligrams during a cylinder cycle while the engine is being cranked and it has been determined that the engine reverse rotated after engine cranking, then during a subsequent engine cycle with the same cranking conditions, the amount of fuel in the first pilot fuel injection may be reduced to 2 milligrams, the amount of fuel in the second pilot fuel injection may be increased to 4 milligrams, and the amount of fuel injected during the main injection may be increased to 7 milligrams.

Additionally, the actual total number of pilot fuel injections may be reduced in response to reversed engine rotation. For example, if an engine includes two pilot fuel injections of 3 milligrams each and a main fuel injection of 6 milligrams during a cylinder cycle before the engine reverse rotated, then during a subsequent engine cycle with the same cranking conditions, the actual total number of pilot fuel injections may be adjusted to provide only one pilot fuel injection. The amount of fuel in the first and only pilot fuel injection during a subsequent cylinder cycle may be increased to 4 milligrams. The one pilot fuel injection's start of fuel injection time may be retarded from the start of injection timing of the original pilot fuel injection in the prior cylinder cycle. Further, the amount of fuel injected during the main injection may be increased to 10 milligrams. Thus, not only may the start of fuel injection timing be adjusted responsive to reverse engine rotation, the actual total number of pilot fuel injections and the amounts of fuel in the pilot fuel injections may be adjusted responsive to reverse engine rotation. Method 400 proceeds to 434.

At 434, method 400 supplies fuel to engine cylinders during a next cranking period at the start of fuel injection timing determined at 432. Thus, if an engine is cranked and then rotates in a reverse direction without starting, fuel is supplied with the start of fuel injection timing determined at 418 during the next engine cranking period. The adjustment to start of injection timing may help to increase engine acceleration when the engine is rotating in a forward direction the next time the engine is cranked. The engine is cranked in a forward direction a next time after the engine stops in response to a human driver or autonomous driver engine start request. Method 400 proceeds to exit.

At 450, method 400 monitors pressures in engine cylinders and determines combustion phase in the engine cylinders. In one example, combustion phase is determined via determining a crankshaft angle during a predetermined crankshaft angular interval where cylinder pressure rate of increase changes by more than a threshold amount. For example, cylinder pressure may be monitored in a cylinder from a time or crankshaft angle where fuel injection to the cylinder starts to a predetermined number of crankshaft degrees after top-dead-center compression stroke of the cylinder during a cycle of the cylinder. The combustion phase or ignition time for the cylinder may be determined as the crankshaft angle where pressure in the cylinder increases by more than a threshold amount. Method 400 proceeds to 452.

At 452, method 400 judges if the combustion phase is earlier than a predetermined threshold engine crankshaft angle. For example, if combustion phase is determined as 10 crankshaft degrees before top-dead-center compression stroke of the cylinder receiving the fuel, and the threshold crankshaft angle is 5 crankshaft degrees before top-dead-center compression stroke, then the answer is yes and method 400 proceeds to 454. If the combustion phase is not earlier than a predetermined threshold engine crankshaft angle, then the answer is no and method 400 proceeds to 456.

At 456, method 400 maintains the present start of fuel injection timing for engine cylinders. The start of fuel injection timing is not further retarded so that the engine may accelerate at a desired rate. In some examples, if the combustion phase is retarded more than a threshold amount from the threshold engine crankshaft angle described at 452, then the start of fuel injection timing for engine cylinders may be advanced so that a desired rate of engine acceleration during engine run-up may be provided. Method 400 proceeds to exit.

At 454, method 400 adjusts start of fuel injection timing for one or more engine cylinders responsive to combustion phase determined at 450. For example, if engine combustion phase for cylinder number one is determined to be 30 crankshaft degrees before top-dead-center compression stroke of cylinder number one, then start of fuel injection timing for injecting fuel to cylinder number one during a next cycle of cylinder number one may be retarded by 5 crankshaft degrees from the present start of fuel injection timing. In one example, a table or function of empirically determined start of fuel injection timing adjustments is referenced by the combustion phase value for the cylinder and the table or function outputs an adjustment value that is added to the start of fuel injection timing for an engine cylinder. Method 400 proceeds to exit after adjusting start of fuel injection timing during each cylinder cycle during engine cranking.

In addition, method 400 may adjust an amount of fuel that is supplied during pilot fuel injections of a subsequent cylinder cycle after it has been determined that combustion phase is earlier than a threshold timing. In particular, the amount of fuel in a pilot fuel injection may be reduced and an amount of fuel in a main fuel injection during the subsequent cylinder cycle may be increased by the amount of fuel that is removed from one or more pilot fuel injections in response to cylinder combustion phase or timing being earlier than a threshold timing. For example, 1 milligram of fuel may be removed from one or more pilot fuel injections and added to a main fuel injection for a cylinder cycle after advance combustion phase timing has occurred.

In another example, 1 milligram of fuel may be removed from a first pilot fuel injection of a subsequent cylinder cycle after advance combustion phasing or timing has been detected and added to a later pilot fuel injection for the subsequent cylinder cycle after advanced combustion phasing has been detected. In other words, if fuel injection to an engine cylinder includes two pilot fuel injections of 3 milligrams and a main fuel injection of 6 milligrams during a cylinder cycle while the engine is being cranked and it has been determined that advanced combustion phasing is present, then during a subsequent engine cycle with the same cranking conditions, the amount of fuel in the first pilot fuel injection may be reduced to 2 milligrams, the amount of fuel in the second pilot fuel injection may be increased to 4 milligrams, and the amount of fuel injected during the main injection may be increased to 7 milligrams.

In addition, the actual total number of pilot fuel injections may be reduced in response to combustion phasing that is advanced from a threshold timing. For example, if an engine includes two pilot fuel injections of 3 milligrams each and a main fuel injection of 6 milligrams during a cylinder cycle before the advanced combustion phasing is detected, then during a subsequent engine cycle with the same cranking conditions, the actual total number of pilot fuel injections may be adjusted to provide one pilot fuel injection. The amount of fuel in the first and only pilot fuel injection during a subsequent cylinder cycle may be increased to 4 milligrams.

The one pilot fuel injection's start of fuel injection time may be retarded from the start of injection timing of the original pilot fuel injection in the prior cylinder cycle. Further, the amount of fuel injected during the main injection may be increased to 10 milligrams. Thus, not only may the start of fuel injection timing be adjusted responsive to engine combustion phasing being greater than a threshold timing, the actual total number of pilot fuel injections and the amounts of fuel in the pilot fuel injections may be adjusted responsive to engine combustion phasing timing being greater than a threshold timing.

In this way, it may be possible to adjust the start of fuel injection timing to quickly compensate for fuels having higher cetane levels. The cylinder pressure signals may provide useful insight to the cetane level of the fuel being injected to the engine.

Thus, the method of FIGS. 4-6 provides for an engine operating method, comprising: receiving sensor data to a controller; and adjusting start of fuel injection timing for a cylinder cycle of a subsequent engine start responsive to an indication of reverse engine rotation generated via the received sensor data before the subsequent engine start. The subsequent engine start may be an engine starting attempt that follows an engine starting attempt where the engine did not start. Alternatively, the subsequent engine start may follow an engine start where the engine started, but with a low engine acceleration rate or an extended engine cranking time. The engine method includes where adjusting start of fuel injection timing includes retarding fuel injection timing, and further comprises adjusting an amount of pilot fuel injected to a cylinder for the cylinder cycle responsive to the indication of reverse engine rotation; and adjusting a total number of pilot fuel injections for the cylinder cycle responsive to the indication of reverse engine rotation.

In some examples, the engine method includes where adjusting start of fuel injection timing includes retarding fuel injection timing responsive to a rate of change of engine acceleration. The engine method includes where the sensor data is engine position sensor data. The engine method includes where adjusting start of fuel injection timing includes retarding fuel injection timing responsive to a combustion phasing in an engine cylinder. The engine method includes where the indication of reverse engine rotation is after engine cranking and before an engine is started. The engine method further comprises injecting fuel to an engine at the adjusted start of fuel injection timing during a first engine start after the indication of reverse engine rotation. The engine method includes where the indication of reverse engine rotation is provided via the received sensor data in response to compression ignition initiated via injecting a fuel having a cetane number greater than a threshold number.

The method also provides for an engine operating method, comprising: cranking an engine and injecting fuel to the engine while cranking the engine via a controller; and adjusting start of fuel injection timing for a cycle of a cylinder responsive to combustion phase in the cylinder while cranking the engine. The engine method includes where cranking the engine comprises rotating the engine via an electric machine, and where the combustion phase is timing of initiation of combustion in the cylinder. The engine method includes where the combustion phase is based on pressure in the cylinder, and further comprising: adjusting an amount of pilot fuel injected to a cylinder for the cylinder cycle responsive to the combustion phase in the cylinder while cranking the engine; and adjusting a total number of pilot fuel injections for the cylinder cycle responsive to the combustion phase in the cylinder while cranking the engine.

In some examples, the engine method includes where the combustion phase is further based on a change in a rate of pressure increase in the cylinder. The engine method includes where adjusting start of fuel injection timing includes retarding start of fuel injection timing. The engine method further comprises incrementally retarding the start of fuel injection timing for each cylinder cycle the combustion phase of the cylinder is advanced more than a threshold timing.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, 1-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine operating method, comprising:
   receiving sensor data to a controller; and
   adjusting start of fuel injection timing for a cylinder cycle of a subsequent engine start responsive to an indication of reverse engine rotation generated via the received sensor data before the subsequent engine start.

2. The engine method of claim 1, where adjusting the start of fuel injection timing includes retarding fuel injection timing, and further comprising:
   adjusting an amount of pilot fuel injected to a cylinder for the cylinder cycle responsive to the indication of reverse engine rotation; and
   adjusting a total number of pilot fuel injections for the cylinder cycle responsive to the indication of reverse engine rotation.

3. The engine method of claim 2, where adjusting start of fuel injection timing includes retarding fuel injection timing responsive to a rate of change of engine acceleration.

4. The engine method of claim 1, where the sensor data is engine position sensor data.

5. The engine method of claim 1, where adjusting the start of fuel injection timing includes retarding fuel injection timing responsive to a combustion phasing in an engine cylinder.

6. The engine method of claim 1, where the indication of reverse engine rotation is after engine cranking and before an engine is started.

7. The engine method of claim 1, further comprising injecting fuel to an engine at the adjusted start of fuel injection timing during a first engine start after the indication of reverse engine rotation.

8. The engine method of claim 1, where the indication of reverse engine rotation is provided via the received sensor data in response to compression ignition initiated via injecting a fuel having a cetane number greater than a threshold number.

9. An engine operating method, comprising:
   cranking an engine and injecting fuel to the engine while cranking the engine via a controller; and
   adjusting start of fuel injection timing for a cycle of a cylinder responsive to combustion phase in the cylinder while cranking the engine, where the combustion phase is based on pressure in the cylinder;
   adjusting an amount of pilot fuel injected to the cylinder for the cylinder cycle responsive to the combustion phase in the cylinder while cranking the engine; and
   adjusting a total number of pilot fuel injections for the cylinder cycle responsive to the combustion phase in the cylinder while cranking the engine.

10. The engine method of claim 9, where cranking the engine comprises rotating the engine via an electric machine, and where the combustion phase is timing of initiation of combustion in the cylinder.

11. The engine method of claim 9, where the combustion phase is further based on a change in a rate of pressure increase in the cylinder.

12. The engine method of claim 9, where adjusting the start of fuel injection timing includes retarding the start of fuel injection timing.

13. The engine method of claim 9, further comprising incrementally retarding the start of fuel injection timing for each cylinder cycle when the combustion phase of the cylinder is advanced more than a threshold timing.

14. An engine system, comprising:
   a diesel engine including a cylinder, a fuel injector supplying fuel to the cylinder, and an engine position sensor;
   a starter coupled to the diesel engine; and
   a controller including executable instructions stored in non-transitory memory to adjust start of fuel injection of the fuel injector for a cycle of the cylinder in response to engine deceleration during cranking of the diesel engine via the starter.

15. The engine system of claim 14, where the engine deceleration is within a predetermined engine crankshaft angle range, and further comprising:
   additional instructions to adjust the start of fuel injection of the fuel injector for the cylinder cycle in further response to engine acceleration during engine run-up being less than a threshold acceleration level, and additional instructions to adjust an amount of pilot fuel injected to the cylinder via the fuel injector for the cylinder cycle responsive to the engine deceleration during the cranking of the diesel engine.

16. The engine system of claim 15, where the predetermined engine crankshaft angle range begins at a crankshaft angle where the start of fuel injection of the fuel injector begins and ends before top-dead-center compression stroke of the cylinder.

17. The engine system of claim 14, further comprising additional instructions to adjust the start of fuel injection of the fuel injector responsive to battery state of charge and an estimate of fuel cetane after adding fuel to a fuel tank.

18. The engine system of claim 14, further comprising additional instructions to retard start of fuel injection of the fuel injector for a subsequent cylinder cycle after the cylinder cycle in response to engine acceleration being less than a threshold amount during run-up of the engine.

19. The engine system of claim 14, further comprising additional instructions to adjust the start of fuel injection of the fuel injector in response to ambient temperature.

* * * * *